Aug. 26, 1941.  E. KLEPETKO  2,253,566
RECOVERY OF SULPHUR
Filed May 14, 1938
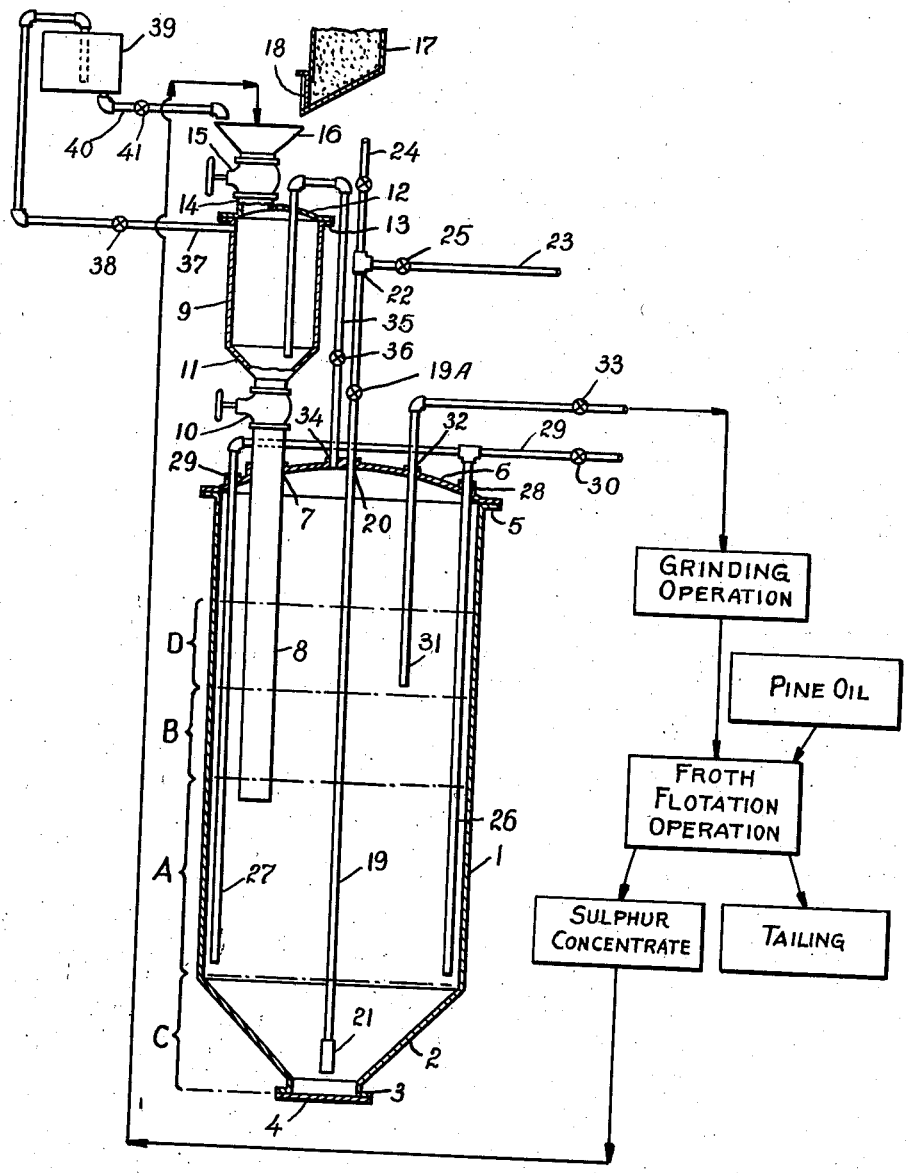
INVENTOR
ERNEST KLEPETKO
BY
Pennie Davis Marvin & Edmonds
ATTORNEYS Patented Aug. 26, 1941

2,253,566

UNITED STATES PATENT OFFICE 2,253,566

RECOVERY OF SULPHUR

Ernest Klepetko, Pacific Palisades, Calif.

Application May 14, 1938, Serial No. 207,869

3 Claims. (Cl. 23—308)

This invention relates to extraction of sulphur from a mixture thereof with material which is solid at the melting point of sulphur, for example, sulphur ore in which elemental sulphur occurs in the presence of gangue, for example, gypsum.

If ore containing elemental sulphur is heated to a temperature above the melting point of sulphur in the presence of water, the sulphur melts and tends to separate from the gangue and collect in the form of a pool, the gangue material remaining more or less suspended in a layer of water above the sulphur pool. Heating of the mass of water and ore preferably is accomplished by direct injection of steam or other hot gas.

The invention provides an improved method and improved apparatus for extracting sulphur from a mixture thereof with a material that is solid at the melting point of sulphur, by heating the mixture in a chamber in the presence of water by direct injection of a hot gas (preferably steam). In accordance with the invention, the mixture is thus heated in a chamber in a zone into which steam is admitted and which, consequently, is turbulent, the turbulent zone being overlain by a second zone which is relatively quiescent, so that there is additional opportunity for sulphur to segregate from the solid material (gangue) and coalesce into relatively large globules which settle down through the turbulent zone into an underlying pool of molten sulphur. The gangue accompanied by water is withdrawn from the upper zone. Preferably, the withdrawal of gangue and water is accomplished intermittently so that the upper zone remains relatively quiescent for a maximum portion of the operating period and is not disturbed by the withdrawal. In a preferred modification of the new process, the withdrawn gangue is subjected to a froth flotation operation to remove any accompanying sulphur, the resulting sulphur concentrate being returned to the chamber. I have found that flotation reagents which accompany the returned concentrate do not interfere with separation of sulphur in the chamber.

Preferably the mixture from which the sulphur is to be extracted is introduced into the chamber in batches to replace the volume of a withdrawn batch of gangue and water. The withdrawal of molten sulphur from the chamber is effected, advantageously continuously, through a conduit rising upwardly through the chamber from the pool of molten sulphur that collects below the turbulent heating zone. This means for withdrawing molten sulphur from the chamber avoids the need for pipe connections, etc. in the bottom of the chamber; such connections are objectionable for they are prone to develop leaks because of the extremely penetrating character of molten sulphur, and if leaks develop they constitute a very serious fire hazard. Moreover, that portion of the sulphur withdrawal conduit in which sulphur is apt to collect when not flowing is thus disposed wholly within the heated chamber, and in consequence the danger of sulphur freezing in the conduit is minimized.

The apparatus of the invention comprises, in brief, a chamber, means for introducing the charge from which sulphur is to be extracted (preferably intermittently) into the lower portion of a body of water in the chamber, means for introducing a heating gas (preferably steam) into a portion of the body below that at which the charge is introduced, means for withdrawing separated molten sulphur (preferably continuously) from a pool collecting below the body of water, and means for withdrawing water and solids separated from the charge (preferably intermittently) from a point in an upper and relatively quiescent portion of the body of water, said point being substantially above that at which the charge is introduced. Preferably, both the means for introducing the charge and the means for withdrawing the molten sulphur and the separated solid material are conduits extending upwardly through the top of the chamber, the sulphur and solid material being forced upwardly through these conduits by the gas pressure developed within the chamber.

These and other features of the invention will be more clearly understood in the light of the following detailed description considered in conjunction with the accompanying drawing, showing in elevation and partly in section a presently preferred form of sulphur extraction apparatus in accordance with my invention, and illustrating schematically the nature of the process of the invention.

The apparatus of the invention comprises an upright cylindrical heating chamber 1 of steel or the like, provided with an inverted frusto-conical bottom section 2 which preferably is welded to the cylindrical portion. The frusto-conical section is provided with a horizontal outwardly extending flange 3 to which a closure plate 4 is fastened tightly by bolts or other fastening means, not shown. Because it will seldom be necessary to remove the closure plate and because of the tendency of molten sulphur to penetrate joints, it is desirable to fasten the closure plate to the flange by a light but impervious weld.

The top of the chamber is provided with a horizontal annular flange 5 upon which rests a domed top or cover 6, through which project the various conduits for admission and withdrawal of the material from the chamber.

Projecting vertically into the chamber through a sealed joint 7 is a charge pipe 8 of relatively large diameter. The charge pipe extends downwardly within the chamber to a point about two-fifths of the way above the bottom of the cylindrical portion of the chamber, and projects slightly into a zone A, hereinafter designated as the normal treatment zone. The upper end of the charge pipe communicates with a charge chamber 9 through a valve 10. The charge chamber is a small and vertically disposed cylindrical chamber having an inverted frusto-conical bottom section 11 disposed immediately above the valve. The charge chamber is closed by a domed top 12, fastened to a flange 13 extending around the top of the cylindrical portion of the charge chamber. A vertical nipple 14 extends upwardly from the domed top to a valve 15 above which is mounted a hopper 16 for supplying water and ore containing elemental sulphur to the charge chamber. An ore bin 17 is disposed immediately above the hopper and is provided with a gate 18 for admitting ore into the hopper.

A vertical sulphur discharge pipe 19 of relatively small diameter extends upwardly from a point within the lower inverted frusto-conical section of the heating chamber through a sealed joint 20 in the domed top to a point above the heating chamber. The lower end of the sulphur discharge pipe may, if desired, be provided with a porous filter member, advantageously in the form of tube 21 of alundum or other porous material that is closed at the lower end. Above the domed top, the sulphur discharge pipe 19 is provided with a control valve 19A. A T 22 is provided in the pipe above the control valve and the sulphur discharge pipe continues as a pipe 23 extending horizontally from the T. A valved steam line 24 extends upwardly from the T, and a valve 25 is provided in the horizontal line 23.

A pair of steam inlet pipes 26, 27 extend downwardly on either side of the heating chamber respectively through sealed joints 28, 29 in the domed top, and are connected to a horizontal steam supply line 29 which carries a steam control valve 30. The steam inlet pipes extend to the lower portion of the heating chamber, i. e., to points immediately above the inverted frusto-conical section of the heating chamber.

A gangue withdrawal line 31 extends upwardly through the sealed joint 32 in the domed cover of the heating chamber from a point about three-fifths of the way from the bottom of the cylindrical portion of the heating chamber. A control valve 33 is disposed in the gangue withdrawal pipe. The lower end of the gangue withdrawal pipe approximately defines the upper horizontal boundary of a zone B of relative quiescence, hereinafter called the middling zone. The middling zone adjoins the normal treatment zone A.

Tapped in the domed top of the heating chamber through a sealed joint 34 is a steam discharge pipe 35 having a valve 36. The steam discharge pipe enters the charge chamber through a sealed joint in the domed top thereof and extends downwardly to the inverted frusto-conical section of the charge chamber. A steam bleed line 37 provided with a valve 38 is tapped into an upper portion of the charging chamber and extends horizontally, thence upwardly and thence downwardly over the edge to the bottom of a water storage tank 39. A drain line 40 extends from the bottom of the water storage tank to the hopper 16. A valve 41 is disposed in the drain line. Means such as a water main (not shown) are provided for supplying primary water to the water storage tank.

The inverted frusto-conical section of the heating chamber identified as the zone C on the drawing, will hereinafter be referred to as the "sulphur collection zone," the dotted line separating zone A and zone C being at the approximate level of the normal sulphur bath in the heating chamber. Immediately above the middling zone B of the heating chamber is a zone defined on the drawing by horizontal lines and marked D which will be referred to hereinafter as the "clean zone." The upper horizontal line defining the clean zone is the normal liquid level in the heating chamber, the space above this line being normally occupied by steam.

The volume of the charging chamber 9 advantageously is approximately equal to the volume of the zone D which in turn, in a presently preferred operation, is about one-fifth of the volume of the cylindrical portion of the heating chamber.

The operation of the process of my invention in the hereinbefore described apparatus is as follows:

Ore containing elemental sulphur is ground preferably to about ⅛ inch size and is fed into the charging chamber from the bin with the upper valve 15 open and the lower valve 10 closed. Water is also admitted into the charging chamber, say in amount sufficient to cover the ore charge, and aids in washing the charge into the chamber. The valve 15 is closed thereafter and steam is admitted into the heating chamber and thence into the charge chamber through the pipes 26, 27 and 43, respectively. Next the valve 10 is opened to permit the charge to fall into the zone A where in the presence of additional water (which may be left over from other charges or introduced prior to the beginning of the operations as described hereinbefore) it is heated so that the sulphur melts and collects as a pool in the zone C, from which it may be discharged, preferably continuously, through the discharge pipe 19, the T 22 and the horizontal line 23. The alundum or other porous filter 21 filters out unmelted gangue that may find its way into the sulphur pool in zone C. The filter is particularly useful when treating ores having gangue of high specific gravity that tends to settle through the turbulent normal treatment zone. The filter may be cleaned periodically by closing the valve 25 and opening the valve in the pipe 24 to admit steam to the pipe 19 and allow it to blow back through the filter.

Above the sulphur pool in the zone C there is a body of water, gangue and sulphur which may be considered as divided roughly into three zones A, B and D. The principal melting of the sulphur is accomplished in zone A, which zone is rendered turbulent by the introduction of the steam. In the zone B, which merges and grades into the upper portion of the zone A, but is relatively quiescent, segregation of sulphur and gangue tends to occur, the sulphur dropping down through the zone A into the pool and the gangue rising into the zone D which is also relatively quiescent. In this latter zone the gangue material is accompanied by only slight amounts of sulphur.

As indicated hereinbefore, sulphur from the pool is forced out, preferably continuously, through the pipe 19 and the horizontal line 23. The sulphur discharged from the apparatus is substantially pure and after it has solidified is ready for market. A mixture of gangue and water containing only relatively conditioned small amounts of sulphur similarly is forced out from the zone D through the pipe 31.

The pressure necessary to force the molten sulphur and the mixture of water and gangue out of the heating chamber is supplied by the steam admitted through the pipes 26, 27. Steam under a pressure of 25 to 30 lbs. per square inch by gauge is desirable not only to attain the necessary force to drive the products from the heating chamber but also because steam at this pressure has a temperature in excess of the melting point of the sulphur, and so suffices to maintain the temperature (advantageously about 260 to 275° F.) necessary for operation of the process.

There is, of course, a tendency for the steam to condense within the heating chamber and thus add to the volume of water in the system. The liquid level in the heating chamber should not be allowed to rise to the top of the chamber and any excess normally will be drained out with the gangue material through the line 31. In the event that the volume of water resulting from the condensation of steam in the heating chamber is insufficient for the needs of the process, fresh water may be introduced into the water storage tank 47 and thence into the charging chamber through the pipe 48.

The gangue or residue withdrawn through the pipe 31 frequently contains sufficient elemental sulphur to justify an additional operation in order to recover it. This is conveniently accomplished by subjecting the withdrawn gangue to a froth flotation operation. To this end, the residue first is ground to a sufficient degree of fineness (for example, so that bulk of it is minus 48-mesh) to insure effective separation of the sulphur from the admixed gangue. The product of the grinding operation is agitated in the form of an aqueous pulp with a small amount (less than 1% by weight) of pine oil or other suitable flotation reagent in a flotation cell of conventional construction. The use of pine oil alone as the flotation agent results in a clean separation of the sulphur from the gangue. The flotation tailing contains very little elemental sulphur and may be discharged to waste. The flotation concentrate contains the bulk of the sulphur that accompanied the gangue withdrawn from the heating chamber, and this concentrate is reintroduced into the heating chamber through the charging chamber 9 together with a fresh charge of ore for the purpose of recovering the sulphur that it contains.

In order to preheat the charge, steam is passed from the vapor space above the zone D in the heating chamber through the pipe 43 into the charge member. Excess and uncondensed steam from the charge chamber is led through the line 45 into the water storage tank so that its heat is there recovered. The process of the invention is highly efficient as far as steam consumption is concerned, waste heat from the heating chamber being employed successively to preheat the charge in the charging chamber and to preheat the water in the storage chamber. The apparatus may, of course, be lagged with heat insulating material to increase its thermal efficiency.

Because of the tendency of molten sulphur to leak through small cracks and apertures through which water will not penetrate, my preferred form of apparatus has been designed so that all of the inlets and outlets to the heating chamber pass through the top of the chamber above the sulphur pool, thus reducing the number of joints in the bottom of the chamber to a minimum. Since the clean-out hole covered by the closure plate 4 is seldom used, it can be properly sealed, for example by a light weld. If, however, difficulties are encountered in maintaining a proper seal below the sulphur pool, the clean-out hole can be omitted and the bottom of the tank made integral, so that there are no joints through which sulphur can seep.

Although the invention has been described above with particular reference to continuous operation, the process may be carried out in batch operations, and in such case a somewhat simpler form of apparatus may be employed. For example, in a batch operation the charge chamber may be omitted from the apparatus and the charge may be introduced directly into the cylindrical heating chamber after substantially cleaning the chamber of its previous charge. It is not difficult to establish and maintain in a batch operation the several treatment zones described above, but of course in such operation the extent to which each treatment zone occupies the chamber varies as the operation proceeds toward completion.

I claim:

1. In a process for extracting sulphur from an ore comprising a mixture of sulphur with gangue material that is solid at the melting point of sulphur, involving heating the ore in the presence of water to melt the sulphur and cause it to separate as a pool overlain by an aqueous body containing the solid material in suspension, the improvement which comprises introducing steam substantially free of liquid water into the aqueous body adjacent the sulphur pool whereby the aqueous body is heated and a turbulent zone is established therein without substantial flow of liquid therethrough, introducing the ore into said turbulent zone at a point a substantial distance above the point at which the steam is introduced, whereby the sulphur of the ore is melted in the turbulent zone and collects in the pool of sulphur below the aqueous body and the unfused material rises and collects in a relatively quiescent zone in the aqueous body above the point at which the ore is introduced, withdrawing molten sulphur from the sulphur pool, and withdrawing unfused gangue and water from said relatively quiescent zone of the aqueous body.

2. In a process for extracting sulphur from an ore comprising a mixture of sulphur with gangue material that is solid at the melting point of sulphur, involving heating the mixture in the presence of water to melt the sulphur and cause it to separate as a pool overlain by an aqueous body containing the solid material in suspension, the improvement which comprises introducing steam substantially free of liquid water into the aqueous body adjacent the sulphur pool to heat the aqueous body and create a turbulent zone therein without substantial flow of liquid therethrough, introducing the ore into said heated turbulent zone a substantial distance above the point at which the steam is introduced, whereby the sulphur of the ore is melted in the turbulent zone and collects in the pool below the aqueous body and the bulk of the unfused gangue material rises and collects in a relatively quiescent zone of the aqueous body above the turbulent zone, concurrently filtering and withdrawing clean molten sulphur from the pool, and withdrawing water and unfused gangue material from said relatively quiescent zone of the aqueous body.

3. In a process for extracting sulphur from an ore comprising a mixture of sulphur with gangue material that is solid at the melting point of sulphur, involving heating the ore in the presence of water in a heating chamber to cause the sulphur to melt and collect as a pool of molten sulphur overlain by an aqueous body containing gangue material in suspension and withdrawing sulphur from the pool, the improvement which comprises introducing steam substantially free of liquid water into the aqueous body above the pool to heat the aqueous body and create a turbulent zone in the lower portion thereof, introducing the ore into said turbulent zone a substantial distance above the point at which steam is introduced, whereby the sulphur of the ore is melted in the turbulent zone and collects for the most part in the pool of sulphur and unfused gangue material with some sulphur rises and collects in a relatively quiescent zone above the turbulent zone, withdrawing water and unfused gangue material with some sulphur from the upper portion of said quiescent zone, subjecting the withdrawn gangue material to a flotation operation to separate the gangue material from sulphur withdrawn with it and form a substantially gangue-free sulphur concentrate, and reintroducing the sulphur concentrate into the turbulent zone of the aqueous body in the heating chamber to recover the sulphur contained in said concentrate.

ERNEST KLEPETKO.